United States Patent Office 3,773,910
Patented Nov. 20, 1973

3,773,910
PREPARATION OF SOLID COMPOSITION OF MATTER CONTAINING LARGE PERCENTAGES OF SULFURIC ACID
Harold W. Wilson, El Paso, Tex., assignor to Wilson & Chandler
No Drawing. Filed Nov. 2, 1971, Ser. No. 195,004
Int. Cl. C01b 17/72, 17/90
U.S. Cl. 423—530         28 Claims

ABSTRACT OF THE DISCLOSURE

Sulfuric acid can be converted into a solid form composition of matter containing large quantities of hydrolyzable and chemically uncombined sulfuric acid by a process in which the sulfuric acid is reacted with alkaline earth metal silicates to form alkaline earth metal bisulfate and metasilicic acid-sulfuric acid adsorbates. The sulfuric acid can be recovered from these solid form compositions by controlled heating at temperatures in the range of about 340–950° C.

BACKGROUND OF THE INVENTION

Field of the invention

The present invention relates to sulfuric acid, and more particularly to a method whereby liquid sulfuric acid can be converted into solid form compositions of matter which, in turn, can be processed to recover their entire content of sulfuric acid.

Description of the prior art

Vast quantities of sulfuric acid are expected to become available in the immediately forseeable future as a result of the environmental effort to control the quantities of sulfur dioxide discharged to the atmosphere. Much of this waste sulfur dioxide is being converted into hazardous and highly corrosive liquid sulfuric acid, for which no immediate consuming need seems to exist. In addition large amounts of sulfuric acid are available to be reclaimed from alkylation acid sludges, a by-product of the petroleum industry. The liquid acid recoverable from these sludges is highly odorous, difficult to dispose of, and, like all concentrated sulfuric acid regardless of source, difficult to handle, transfer and store.

While these huge quantities of sulfuric acid are no doubt extremely valuable, there appears to be insufficient present and projected future demand to economically make use of the quantities available. At the same time there exists no economical means for conserving the acid for future use, particularly in view of the manifold problems associated with prolonged safe storage of so hazardous a substance.

SUMMARY OF THE INVENTION

It is therefore an object of the present invention to provide a process whereby these huge quantities of sulfuric acid can be converted into stable solid-form compositions of matter.

It is another object of this invention to provide a process whereby sulfuric acid can be converted to a form which, because of its stable chemical and physical nature, can be readily handled and transported and safely stored for long periods of time.

It is still another object of this invention to provide a process whereby liquid sulfuric acid can be converted to a solid form composition of matter from which the sulfuric acid can be readily recovered.

It is yet another object of this invention to provide a process for recovering liquid sulfuric acid from solid form compositions of matter.

Other objects and advantages will become apparent from the following description and appended claims.

Briefly stated, the aforesaid objects are accomplished by the present invention by bringing liquid sulfuric acid into contact with alkaline eath metal silicates, in the presence of a limited quantity of water to form solid-form compositions of matter comprising alkaline earth metal bisulfates and metasilicic acid-sulfuric acid adsorbates which contain large percentages of hydrolyzable and chemically uncombined sulfuric acid. Accordingly, the highly corrosive, hazardous, difficult to handle, transfer and store liquid sulfuric acid and its aqueous solutions are converted into solid form, non-odorous chemical compositions of matter having greatly reduced corrosivity, and which can be far more easily and safely be handled, transferred and stored. Thereafter, when it is desired to recover the liquid sulfuric acid, the solid-form compositions of matter are heated under controlled conditions to temperatures within the range 340°–950° C. to cause decomposition of the bisulfate salts, volatilization of the uncombined sulfuric acid, volatilization of sulfur dioxide and of sulfur trioxide, and reformation of solid residues of alkaline earth metal silicates. These solid residues of alkaline earth metal silicates can then be reused to convert liquid sulfuric acid to the solid-form alkaline earth bisulfate and metasilicic acid-sulfuric acid adsorbates of the present invention.

DETAILED DESCRIPTION OF THE INVENTION

It has been found that metal and pyrosilicic acids, in the presence of alkaline earth metal oxides, are capable of dehydrating sulfuric acid. When such dehydration is controlled, for example by controlling the temperature of the reaction system, it is possible to produce new and useful solid-form compositions of matter containing large amounts of chemically uncombined and hydrolyzable sulfuric acid with much smaller amounts of chemically combined sulfuric acid. Generally, the dehydration of sulfuric acid is accomplished by contacting the acid with alkaline earth metal silicates in the presence of limited quantities of water, to initiate a series of reactions which result in the formation of alkaline earth metal bisulfates and metasilicic acid-sulfuric acid adsorbates. As will be more fully discussed hereinafter, hydrated alkline earth metal silicates, such as serpentine, $Mg_3Si_2O_5(OH)_4$, are preferred, although not necessary. Equations 1, 2 and 3 are illustrative of the chemical reactions which are believed to take place during the conversion of the sulfuric acid to solid-form compositions of matter, but are not intended to be limiting in any manner upon the scope of the invention.

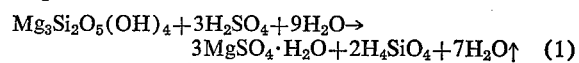

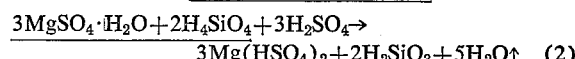

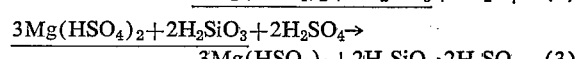

The process of the present invention is essentially concerned with the use of either hydrated, non-hydrated, or mixtures of hydrated and non-hydrated silicates of the alkaline earth metals. Magnesium and calcium silicates are preferred because of their common occurrence, abundance and low cost. Equally important are the facts that they possess excellent capabilities for reacting chemically with the sulfuric acid and that they are able to readily converted into pyro acids and hydrated silica capable of large adsorption of sulfuric acid. Any and all silicates of magnesium and calcium which are known to those skilled in the art to react with mineral acids, regardless of their degree of hydration, will be suitable for use in the present process. As used hereinafter, the term alkaline earth metal silicates or acid-reactive alkaline earth metal silicates refers only to those silicate compositions which react with mineral acids, and which are therefore suitable for use herein.

The present process permits the conversion of liquid sulfuric acid, regardless of source, to the stable, solid-form compositions of the present invention. Thus aqueous solutions of sulfuric acid, ranging in sulfuric acid content from about 50 to 99.5 percent by volume, may be converted into granular solids containing sulfuric acid equivalents as large as eighty percent sulfuric. Waste sources of sulfuric acid, such as the alkylation acid sludges obtained from the use of concentrated sulfuric acid in the chemical refining of petroleum hydrocarbons, may also be used in the present process.

In one embodiment of the present process the solid-form compositions of matter are prepared by a process in which the sulfuric acid is added to the alkaline earth metal silicate in two steps. It has been found that use of a "two-step" acid addition method permits the incorporation of maximum amounts of the acid in the final product while maintaining the reaction product in a solid state form which is reasonably easy and economical to process. Irrespective of whether the sulfuric acid is added all at once to the alkaline earth metal silicate being processed, or is added in separate increments, identical final products will be obtained. However, it has been observed that under some conditions, if the acid is added all at once, a pasty, difficult to handle intermediate product is formed. This is a result of a temporary deficiency in the rate of formation and retarded rate of availability of metasilicic acid and a resultant reduction of sulfuric acid adsorptive capacity. This problem is most evident when highly concentrated sulfuric acid, e.g. in excess of 96% $H_2SO_4$, is added to non-hydrated types of alkaline earth metal silicates, such as amphibole or enstatite (two forms of $MgSiO_3$), forsterite ($Mg_2Si_3O_8$) and sepiolite ($Mg_2Si_3O_8$). However when these same non-hydrated types of alkaline earth metal silicates are processed by the "two-step" acid addition technique, the formation of pasty, semi-solid, difficult to work with intermediate products is eliminated. The "two-step" process is generally preferred when commercial quality sulfuric acid, i.e. sulfuric acid uncontaminated with organic matter and containing essentially no other ingredients other than up to about 50% by volume water, is to be converted to a solid-form composition of matter. The "two-step" process is particularly desirable when very concentrated sulfuric acid is used and/or when non-hydrated alkaline earth metal silicates are employed.

According to the two-step method of sufuric acid incorporation, approximately 35 percent of the total sulfuric acid necessary, calculated to meet the stoichiometric needs of the alkaline earth metal oxide content of the alkaline earth metal silicate employed, is added as an aqueous solution to the alkaline earth metal silicate. The aqueous solution is formed by mixing equal parts by volume of sulfuric acid and water. This aqueous sulfuric acid solution is prepared immediately before its intended usage in order that it will be a near-boiling solution (resulting from the heat of solution) when added to the silicate. The thermal energy of the near-boiling solution serves to inaugurate the strongly exothermic reaction which occurs when alkaline earth metal silicates are brought into contact with the aqueous sulfuric acid solution. It is preferred that the alkaline earth metal silicate be finely divided when the near-boiling aqueous sulfuric acid solution is added. The more finely divided the silicate, the greater will be its reactivity. However, it has been found that alkaline earth metal silicates in the particle size range of 100 percent minus 20 mesh to 100 percent plus 40 mesh (U.S. Std. Sieve sizing) are adequately subdivided to achieve optimum degrees of reactivity with the aqueous sulfuric acid solution. When the near-boiling aqueous sulfuric acid solution is added to the finely divided alkaline earth metal silicate, and intimately combined, a dry powdery-to-granular product is formed.

This intermediate powdery-to-granular product is then intimately mixed with the balance of the stoichiometrically required sulfuric acid (i.e., the remaining 65 percent), with the acid concentration preferably in the range of 96–98.5 percent $H_2SO_4$, to form a granular form composition of matter. The resultant granular form composition is then exposed to external heating in such a manner that the temperature of the composition itself lies preferably in the range of 150–170° C., but at no time exceeds a temperature of 200° C.

The two-step method is particularly desirable since it permits control of the physical state of the mix and promotes a more rapid sulfuric acid dehydration rate by accelerating the formation of ortho- and metasilicic acid. This leads to an increased formation rate for bisulfate ions with consequential more rapid formation of the alkaline earth metal bisulfate salts and the metasilicic acid-sulfuric acid adsorbates. Equations 4 and 5 illustrate a typical two-step process employing the non-hydrated alkaline earth metal silicate $CaSiO_3$:

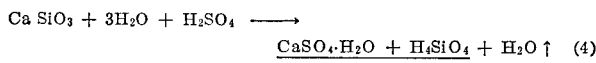

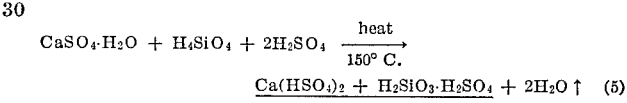

It is critical that the external heating during the second step of the two-step process be closely controlled so that the temperature of the composition remains in the range of about 150–170° C. Prolonged heating at temperatures above about 170° C. or heating at a temperature above 200° C. causes breakdown of the alkaline earth bisulfate and metasilicic acid-sulfuric acid adsorbate with the attendant release of sulfur trioxide. Without intending to limit the scope of the invention by the following explanation, it is believed that this breakdown in attributable in part to the low electropositive level of the alkaline earth metals and their great affinity for hydrated acid anhydrides. Thus it is believed that exposure of the alkaline earth metal bisulfate salts in the presence of hydrated acid anhydrides, such as metasilicic acid, at temperatures in excess of 170° C., causes partial decomposition of the bisulfate salts with liberation of sulfur trioxide and formation of hemi-hydrated acid anhydrides, such as pyrosilicic acid. Continued exposure of these reaction products to high temperatures results in conversion of the bisulfate salts to alkaline earth metal silicates with further liberation of sulfur trioxide. Moreover, at temperatures in excess of 200° C., in the presence of substantial amounts of sulfuric acid, the metasilicic acid-sulfuric acid adsorbate converts to the unstable pyrosilicic acid-sulfuric acid adsorbate, which in turn breaks down to form metasilicic acid and to liberate sulfur trioxide.

In another embodiment of the present process, solid-form compositions of matter identical in every respect with the products of the "two-step" method, can be prepared without resorting to the two-step technique. According to this embodiment, hemi-hydrated alkaline earth metal silicates are brought into contact with concentrated solutions of sulfuric acid (at least 95% $H_2SO_4$) and heated to about 200° C. to inaugurate the formation of the alkaline earth metal bisulfate and metasilicic acid-sulfuric adsorbates. The reactions are believed to proceed according to Equations 6 and 7, in which hemi-hydrates of magnesium pyrosilicate dihydrate and calcium orthosilicate hydrate are combined with sulfuric acid.

$$3MgO \cdot H_2Si_2O_5 + 8H_2SO_4 \xrightarrow[200° C.]{heat}$$
$$3Mg(HSO_4)_2 + 2H_2SiO_3 \cdot 2H_2SO_4 + 2H_2O \uparrow \quad (6)$$

$$4CaO \cdot H_2Si_2O_5 + 10H_2SO_4 \xrightarrow[200° C.]{heat}$$
$$4Ca(HSO_4)_2 + 2H_2SiO_3 \cdot 2H_2SO_4 + 3H_2O \uparrow \quad (7)$$

It is believed, again without intending to limit the scope of the invention, that the reaction mechanism involves the ability of pyrosilicic acid to effectively dehydrate sulfuric acid at the expense of being converted itself into metasilicic acid, which in turn is capable of holding adsorbed sulfuric acid.

The hemi-hydrated silicates may be prepared by controlled heating of alkaline earth metal hydrated silicates to cause the volatilization of their contents of free water and uncombined water plus the loss of their water of hydration to the extent of their being converted into alkaline earth metal oxide hemi-hydrated silicates. Such volatilization may be achieved by heating at temperatures in the range of from about 650–750° C. Equations 8 and 9 are illustrative of the preparation of hemi-hydrated silicates from magnesium pyrosilicate dihydrate $$(Mg_3Si_2O_7 \cdot 2H_2O)$$

and calcium orthosilicate dihydrate ($Ca_2SiO_4 \cdot 2H_2O$) respectively.

$$Mg_3Si_2O_7 \cdot 2H_2O \xrightarrow[650°-750° C.]{heat} 3MgO \cdot H_2Si_2O_5 + H_2O \uparrow \quad (8)$$

$$2(Ca_2SiO_4 \cdot 2H_2O) \xrightarrow[650°-750° C.]{heat} 4CaO \cdot H_2Si_2O_5 + 3H_2O \uparrow \quad (9)$$

In addition, hemi-hydrated alkaline earth metal silicates are formed as the residue during thermal processing of the solid form compositions of matter to recover the sulfuric acid therefrom. As will be more fully discussed hereinafter, this residue is reusable as the alkaline earth metal silicate component of the process of the present invention.

In still another embodiment of the present process, the solid form compositions of matter containing hydrolyzable and chemically combined sulfuric acid may be prepared by treating hydrated alkaline earth metal silicates with concentrated sulfuric acid which has been heated to a temperature in the range from about 135–150° C. The sulfuric acid concentration should be in excess of about 93% $H_2SO_4$ and the particles of alkaline earth metal silicate should preferably be sized in the range from about 0.03 to 0.07 inches.

When the present process is employed with waste alkylation sludges (approximately 70 percent of such sludges are sulfuric acid, and about 5–8 percent is water) the distinctive odor disappears as the solid compositions are formed. A typical reaction of an alkylation sludge with the alkaline earth metal silicate Wollastonite (a synthetic $CaSiO_3$ comprising about 47.65 percent by weight calcium oxide and about 51.87 percent silica) to form a solid-form composition of matter is illustrated by Equation 10:

$$CaSiO_3 + 2H_2SO_4 + SO_2 + H_2O \rightarrow$$
$$Ca(HSO_4)_2 + H_2SiO_3 \cdot H_2SO_3 \quad (10)$$

It is preferred that the waste alkylation sludges have not been aged to the extent that they contain excessive amounts of sulfur dioxide gas, for example in excess of about 2 percent. This is because excess sulfur dioxide gas increase the cost of processing the sludge, since the gas must be trapped to prevent air pollution, and the more sulfur dioxide gas lost during the processing the lower the process efficiency in terms of finished product per unit weight of sludge used.

Care must be exercised when processing waste alkylation sludge sulfuric acid sources to insure that the waste acids are added directly, as such, to the alkaline earth metal silicate employed. In no case should alkylation sludge acids ever be diluted with any amount of water whatsoever prior to their addition to the alkaline earth metal silicate. There are three primary reasons for this. First, water dilution promotes undesirable oxidation-reduction and hydrolytic reactions which cause production of large amounts of unwanted sulfur dioxide gases. Second, water dilution causes the solvation of organic sulfonic acids and attenuant surfactant effects of foam formation and conversion of certain of the organic substances present into unwanted aliphatic hydrocarbon acids. Finally, waste alkylation sulfuric acid sludges almost always will be found to have a content of water sufficient in amount to meet the demands of their reaction with the alkaline earth metal silicates, particularly hydrated alkaline earth metal silicates. Where non-hydrated alkaline earth metal silicates, such as calcium silicate, $CaSiO_3$, and magnesium silicate, $MgSiO_4$, are used, these non-hydrated silicates may be pre-wetted with sufficient water so that approximately 5–7 percent of the weight of the silicate is represented by water. Following pre-wetting, however, the waste alkylation acid is added to the alkaline earth metal silicate in precisely the same manner as though a hydrated silicate were used. The combination of the water normally present as an ingredient of the waste alkylation acid with the water added to the non-hydrated alkaline earth metal silicate will provide all water demands for the required chemical and physical reactions to take place.

Although no water should be added to the waste alkylation sludges directly, it is clear that some limited quantity of water is required by the present process to promote the required reactions between the acid components of the sludge and the alkaline earth metal silicates. Studies have shown that the total water content of the acid sludge, the alkaline earth metal silicate, and any other water present should not be in excess of approximately 15 percent by weight. When the total amount of water present exceeds this amount, not only will the process suffer from the drawbacks previously discussed, but in addition the resultant solid-form compositions of matter will be found to contain substantial quantities of multi-hydrated sulfate salts. While not harmful as such, the presence of such large amounts of water of hydration contributes weight-wise to the non-sulfuric acid portion of the product. As a result the final products contain less sulfuric acid then they could have been made to contain had the amount of water in the reaction system been properly restricted to preclude the formation of such multi-hydrated salts.

The solid sulfuric acid compositions of matter prepared in accordance with the present invention may be processed to recover the sulfuric acid by controlled external heating. Such heating generally causes decomposition of the bisulfate salts, volatilization of the uncombined sulfuric acid, volatilization of sulfur dioxide and of sulfur trioxide, and reformation of solid residues of alkaline earth metal silicates which will lend themselves to re-use. The volatile products may be processed by use of conventional methods presently employed in the commercial manufacture of sulfuric acid as is well known in the art. Such processing can include removal of water, catalytic conversion of sulfur dioxide to sulfur trioxide, and preparation of oleum by the entrapment of sulfur trioxide gas.

It has been found that heat decomposition of the highly acidic solid form compositions of matter takes place in three roughly definable temperature ranges. Accordingly it is possible, through strict temperature regulation, to control the degree of heat decomposition and thereby control the extent of sulfuric acid recovery. Equations 11, 12 and 13 illustrate the thermal processing of the solid compositions of matter in three distinct temperature ranges.

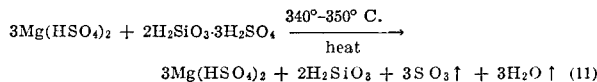

$$3Mg(HSO_4)_2 + 2H_2SiO_3 \cdot 3H_2SO_4 \xrightarrow[\text{heat}]{340°-350° \text{ C.}}$$
$$3Mg(HSO_4)_2 + 2H_2SiO_3 + 3SO_3\uparrow + 3H_2O\uparrow \quad (11)$$

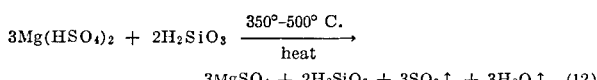

$$3Mg(HSO_4)_2 + 2H_2SiO_3 \xrightarrow[\text{heat}]{350°-500° \text{ C.}}$$
$$3MgSO_4 + 2H_2SiO_3 + 3SO_3\uparrow + 3H_2O\uparrow \quad (12)$$

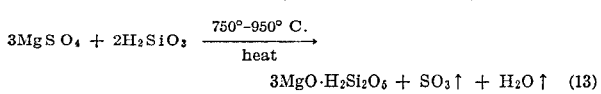

$$3MgSO_4 + 2H_2SiO_3 \xrightarrow[\text{heat}]{750°-950° \text{ C.}}$$
$$3MgO \cdot H_2Si_2O_5 + SO_3\uparrow + H_2O\uparrow \quad (13)$$

In Equation 11, the metasilicic acid adsorbed sulfuric acid decomposes at approximately 340° C. to release sulfur trioxide and water. The sulfur trioxide liberated is equivalent to approximately 35 percent of the total sulfuric acid present.

In Equation 12, the residue of magnesium bisulfate obtained from Equation 11 is partially decomposed in the temperature range of from about 350–500° C. to form magnesium sulfate and to release sulfur trioxide and water. The sulfur trioxide liberated is equivalent to approximately 45 percent of the total sulfuric acid initially present. Thus heating to this temperature range permits recovery of about 75–80 percent of the total sulfuric acid content of the solid form adsorbate.

In Equation 13, the magnesium sulfate is decomposed in the temperature range of from about 750–950° C. to cause the release of the remaining sulfur trioxide and the formation of a residue comprising magnesium oxide holding absorbed pyrosilicic acid, i.e. a hemi-hydrated silicate such as is produced by Equation 8.

Thus, the selective use of processing temperatures permits thermal degradation of the solid form compositions of matter degree-wise to recover varying amounts of the initial sulfuric acid and to produce one of the following non-volatile residues: (1) alkaline earth metal bisulfate salts and metasilicic acid (Equation 11); (2) alkaline earth metal sulfate salts and metasilicic acid (Equation 12); and, (3) hydrated alkaline earth metal silicates (Equation 13). Any one, or all three of these residues are completely capable of reacting with sulfuric acid, as illustrated in Equations 1, 2 and 3, to reform the alkaline earth metal bisulfate salt and metasilicic acid-sulfuric acid adsorbate as it existed prior to thermal processing.

Care should be exercised when thermally processing the solid form compositions of matter to preserve the residue in a reusable form. It has been found to be highly disadvantageous to exceed a heating temperature of about 950° C. or to cause the compositions to be exposed to prolonged heating at temperatures in excess of about 900° C. because such thermal exposures causes the decomposition of at least some portion of the alkaline earth metal oxide-pyrosilicic acid adsorbate to inactivated (i.e. sulfuric acid unreactive) silica ($SiO_2$). Residues consisting of alkaline earth metal oxides deficient in, or nearly absent of pyrosilicic acid adsorbates, as are obtained from excessive thermal exposure, are not suitable for efficient re-use in the process of the present invention. In addition, such residues, when combined with sulfuric acid, result in the formation of a liquid system in contrast to a solid system, and form the single sulfate rather than the double sulfate salt of the alkaline earth metal concerned. Moreover there would be no hydrated silicic acid-sulfuric acid adsorbate present in the resultant liquid-with-sulfuric acid system. It is therefore a preferred form of the thermal decomposition process that the alkaline earth metal bisulfate-hydrated silicic acid-sulfuric acid adsorbate not be exposed to temperatures in excess of 900° C., nor heated for extended periods of time under conditions which encourage the formation of any content of dehydrated silica.

The following examples are illustrative of the general usage of the process to convert sulfuric acid to a solid-form composition from which the sulfuric acid can be subsequently recovered by controlled thermal processing. The sulfuric acid employed in the following examples, in addition to $H_2SO_4$ and water, contained trace amounts of impurities such as lead, iron, copper, nickel, and the like, as are ordinarily found present in commercial or industrial grade sulfuric acid.

EXAMPLE 1

100 grams of serpentine was placed in a suitable container and intimately mixed with 120 ml. of a sulfuric acid solution composed of a mixture of 60 ml. of water and 60 ml. of industrial grade sulfuric acid (97 percent $H_2SO_4$, Sp.G. 1.80). The acid solution was prepared immediately before its intended usage and then added to the lot of serpentine all at one time. The resultant dry, granular-to-powdery, solid, intermediate product was then intimately mixed with 100 ml. of industrial grade sulfuric acid (97 percent $H_2SO_4$) after which this product was converted to a dry, granular solid by heating to a temperature of approximately 150°–160° C. Chemical analysis of a representative portion of this resultant composition-of-matter showed it contained the equivalent of 79.6 percent sulfuric acid of which 70.0 percent or 55.7 parts per 100 parts of the material was present as chemically uncombined and hydrolyzable $H_2SO_4$.

A second representative portion of the product was thermally decomposed by heating to a temperature between 480° and 500°. About 69.1 percent or 55.0 parts of the 79.6 parts of the total content of $H_2SO_4$ was volatilized. Heating the remainder of this product from ambient to a maximum temperature of 900° C. effected a volatilization of 97.2 percent or 77.4 parts of the 79.6 parts of its determined content of $H_2SO_4$.

EXAMPLE 2

In an appropriate container 80 grams of the residue from Example 1, obtained from heating the unused portion of the product from ambient to a maximum temperature of 900° C., was intimately mixed with 130 ml. of industrial grade sulfuric acid (97 percent $H_2SO_4$, Sp.G. 1.80). The acid was added all at one time to the 80 grams of residue. The intermediate solid product was converted to a dry, granular, free-flowing solid by heating to a temperature of approximately 165° C. Chemical analysis of this product showed it to contain 80.1 percent equivalent sulfuric acid ($H_2SO_4$) of which 73.7 percent, or 59.0 parts per 100 parts of product was present in the form of uncombined and hydrolyzable sulfuric acid.

A representative portion of the product was thermally processed by heating it to a temperature of approximately 875° C. The resultant residue contained only 0.71 percent sulfur, equivalent to 2.1 percent sulfuric acid ($H_2SO_4$), the balance having been volatilized during the thermal processing as sulfur trioxide and water.

EXAMPLE 3

A 100 gram lot of serpentine was heated to a temperature of approximately 700° C. for about 15 minutes. At the end of that time it weighed 86.4 grams. After cooling to ambient, the 86.4 grams was combined and mixed with one lot of 300 grams of industrial grade sulfuric acid (97.0 percent $H_2SO_4$, Sp.G. 180) and the resultant mixture heated to a temperature of 190° C. The resulting composition-of-matter weighed 359 grams. Chemical analysis of this material showed that it contained a total sulfuric acid content equivalent to 79.6 percent $H_2SO_4$, of which 71.4 percent was present in uncombined and hydrolyzable form, and 28.6 percent present in combination predominantly with magnesium in the form of magnesium sulfate ($MgSO_4$).

Two hundred grams of this product was thermally processed by heating to a temperature of approximately 800° C. The volatile matter given off was collected in pure sulfuric acid. An analysis showed that the pure acid had an increased content of sulfur trioxide amounting to 156 grams of $SO_3$ which represents 191 grams of pure sulfuric acid (100.0 percent $H_2SO_4$), or 98.2 percent of the total amount of industrial grade sulfuric acid used in preparing this composition-of-matter.

EXAMPLE 4

One 250 gram lot of serpentine was placed in a suitable container and intimately combined with one lot of 625 grams of concentrated sulfuric acid (93 percent $H_2SO_4$) having a temperature at the time of its addition to the serpentine of 140° C. The dry, granular-to-powdery solid product formed shortly after the addition of the hot sulfuric acid to the serpentine had a weight of 724 grams and from chemical analysis was shown to contain 80.2 percent equivalent sulfuric acid ($H_2SO_4$) of which 59.9 parts of the 80.2 parts or 74.7 percent was present as uncombined and hydrolyzable sulfuric acid.

EXAMPLE 5

100 grams of a $MgO \cdot H_2Si_2O_5$ residue obtained from the thermal processing of an adsorbate at a temperature of about 850° C. was combined with 120 ml. of an aqueous sulfuric acid solution consisting of equal parts by volume of 97 percent $H_2SO_4$ and water. The aqueous acid solution was prepared immediately prior to its addition to the residue. A dry, granular-to-powdery product was formed to which an additional eighty (80) grams of concentrated sulfuric acid (97 percent $H_2SO_4$) was immediately added and intimately combined. The resultant product was heated to a temperature in the range from 150–175° C. A dry, free flowing granular solid resulted which was found, upon analysis, to contain 80.7 percent $H_2SO_4$ of which 67.9 percent was present in hydrolyzable and chemically uncombined form, and of which 99.7 percent proved recoverable by thermal processing.

EXAMPLE 6

A 100 gram lot of Wollastonite ($CaSiO_3$) was placed in a suitable container and was intimately combined with an aqueous sulfuric acid solution prepared immediately prior to its use by combining 111 grams of sulfuric acid (98.5 percent $H_2SO_4$) with 120 ml. of water. To the resultant dry, granular solid intermediate product, 149 grams of the same concentrated sulfuric acid was added and combined. The resultant solid granular product was heated to a temperature of about 150–160° C. A composition-of-matter resulted weighing 238 grams and showing by chemical analysis to contain the equivalent of 72.6 percent $H_2SO_4$, of which 70.6 percent was determined to be present as chemically uncombined sulfuric acid.

Heating of a representative sample of this composition-of-matter to a temperature of about 500° C. volatilized about 70.1 percent of the total content of equivalent sulfuric acid determined to have been present.

Chemical examination of a representative portion of the cooled residue showed it to be essentially free of hydrolyzable acid and neutral to bromthymol indicator.

While the present invention has been described with reference to particular embodiments thereof, it will be understood that numerous modifications can be made by those skilled in the art without actually departing from the scope of the invention.

What is claimed as new is as follows:

1. A method of converting liquid sulfuric acid to a solid-form composition of matter comprising the step of reacting said sulfuric acid with an effective amount of an acid-reactive alkaline earth metal silicate in the presence of an effective amount of water at a temperature in the range of about 135°–200° C., the total water present in the reaction system being less than 15 percent by weight of the reactants.

2. A method, as claimed in claim 1, wherein said alkaline earth metal is selected from the group consisting of magnesium and calcium.

3. A method, as claimed in claim 2, wherein said alkaline earth metal silicate is a hydrated silicate.

4. A method, as claimed in claim 3, wherein said alkaline earth metal silicate is $Mg_3Si_2O_5(OH)_4$.

5. A method, as claimed in claim 2, wherein said liquid sulfuric acid contains from 0–50 percent by volume of water.

6. A method, as claimed in claim 5, wherein said liquid sulfuric acid is the major component by volume of an alkylation acid sludge.

7. A method, as claimed in claim 2, wherein said alkaline earth metal silicate is non-hydrated and is pre-wetted, prior to reacting with said sulfuric acid, with sufficient water such that about 5–7 percent by weight of the resulting silicate is water.

8. A method, as claimed in claim 2, wherein the total water present in the reaction system is less than 15 percent by weight of the reactants.

9. A method, as claimed in claim 2, wherein said alkaline earth metal silicate is the residue derived from thermally decomposing compositions of matter containing alkaline earth metal bisulfate and metasilicic acid-sulfuric acid adsorbates by heating said compositions to temperatures in the range from about 340–950° C.

10. A method, as claimed in claim 2, wherein:
   (a) about 35 percent of the stoichiometric quantity of sulfuric acid is dilute with an equal volume of water and the resulting aqueous solution is added to said silicate to form an intermediate powdery-to-granular product;
   (b) the remaining 65 percent of sulfuric acid is added to said intermediate product to form a granular form composition; and,
   (c) said granular form composition is heated to a temperature of from about 150–170° C.

11. A method, as claimed in claim 10, wherein said aqueous solution is prepared immediately prior to its addition to the silicate.

12. A method, as claimed in claim 11, wherein said sulfuric acid contains from 0–50 percent by volume of water.

13. A method, as claimed in claim 12, wherein said sulfuric acid contains at least 96 percent $H_2SO_4$ by volume.

14. A method, as claimed in claim 13, wherein the particle size of the silicate is in the range from about 100 percent minus 20 mesh to 100 percent plus 40 mesh (U.S. Std. Sieve Sizing).

15. A method, as claimed in claim 10, wherein said alkaline earth metal silicate is the residue derived from thermally decomposing compositions of matter containing alkaline earth metal bisulfate and metasilicic acid-sulfuric acid adsorbates by heating said compositions to temperatures in the range from about 340–950° C.

16. A method, as claimed in claim 2, wherein said silicate is a hemi-hydrated alkaline earth metal silicate, said sulfuric acid contains at least 95 percent $H_2SO_4$ by volume, and the reaction mixture of silicate and acid is heated to about 200° C.

17. A method, as claimed in claim 16, wherein said alkaline earth metal silicate is the residue derived from thermally decomposing compositions of matter containing alkaline earth metal bisulfate and metasilicic acid-sulfuric acid adsorbates by heating said compositions to temperatures in the range from about 340–950° C.

18. A method, as claimed in claim 16, wherein said silicate is a hemi-hydrate of magnesium pyrosilicate dihydrate.

19. A method, as claimed in claim 16, wherein said silicate is a hemi-hydrate of calcium orthosilicate dihydrate.

20. A method, as claimed in claim 2, wherein said silicate is a hydrated alkaline earth metal silicate having a particle size in the range from about 0.03–0.07 inch, said sulfuric acid contains at least 93 percent $H_2SO_4$ by volume, and said acid is heated to a temperature in the range of from about 135–150° C. prior to its addition to said silicate.

21. A method of recovering sulfuric acid from solid form compositions of matter containing hydrolyzable and chemically uncombined sulfuric acid comprising:
(a) heating said composition to a temperature in the range of from about 340–950° C.; and,
(d) collecting and processing the volatile products to form sulfuric acid.

22. A method, as claimed in claim 21, wherein said composition is heated to a temperature in the range from about 340–350° C.

23. A method, as claimed in claim 21, wherein said composition is heated to a temperature in the range from about 350–500° C.

24. A method, as claimed in claim 21, wherein said composition is heated to a temperature in the range from about 750–950° C.

25. A method, as claimed in claim 24, wherein said composition is heated to a temperature in the range from about 750–900° C.

26. A method of thermally decomposing solid form compositions of matter containing alkaline earth metal bisulfates and metasilicic acid-sulfuric acid adsorbates to volatilize sulfur dioxide, sulfur trioxide and uncombined sulfuric acid comprising the step of heating said composition to a temperature in the range of from about 340–950° C.

27. A method, as claimed in claim 26, wherein said composition is heated to a temperature in the range from about 750–900° C.

28. A stable, solid form composition of matter containing large quantities of hydrolyzable and chemically uncombined sulfuric acid, said composition comprising essentially alkaline earth metal bisulfate and metasilicic acid-sulfuric acid adsorbates.

References Cited
UNITED STATES PATENTS

| | | | |
|---|---|---|---|
| 3,309,320 | 3/1967 | Helmer | 252—450 |
| 2,356,259 | 8/1944 | Maude et al. | 252—190 |
| 2,446,273 | 8/1948 | Gary | 252—450 |
| 3,338,667 | 8/1967 | Pundsack | 423—520 |
| 3,437,441 | 4/1969 | Mays et al. | 252—450 |
| 3,458,393 | 7/1969 | Battista | 252—450 |
| 3,494,874 | 2/1970 | Flanigen et al. | 252—450 |

LEON D. ROSDOL, Primary Examiner

I. GLUCK, Assistant Examiner

U.S. Cl. X.R.

252—189, 190, 259.5, 450, 145; 423—522, 540